Nov. 15, 1938.　　　　E. E. HEWITT　　　　2,137,018
BRAKE CONTROL MEANS
Filed Aug. 19, 1937　　　2 Sheets-Sheet 1
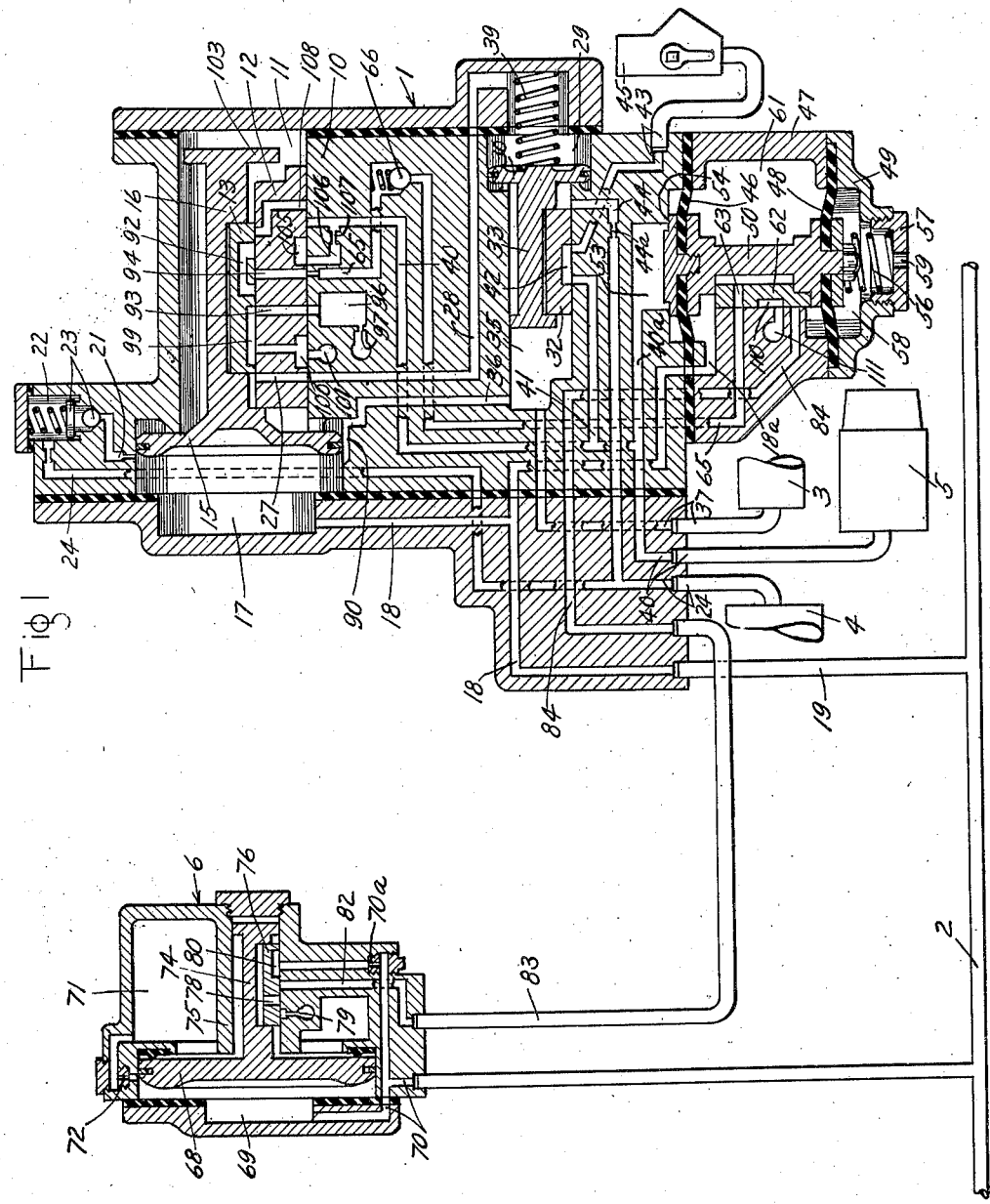
INVENTOR
ELLIS E. HEWITT
BY _Wm. M. Cady_
ATTORNEY Nov. 15, 1938.  E. E. HEWITT  2,137,018
BRAKE CONTROL MEANS
Filed Aug. 19, 1937  2 Sheets-Sheet 2
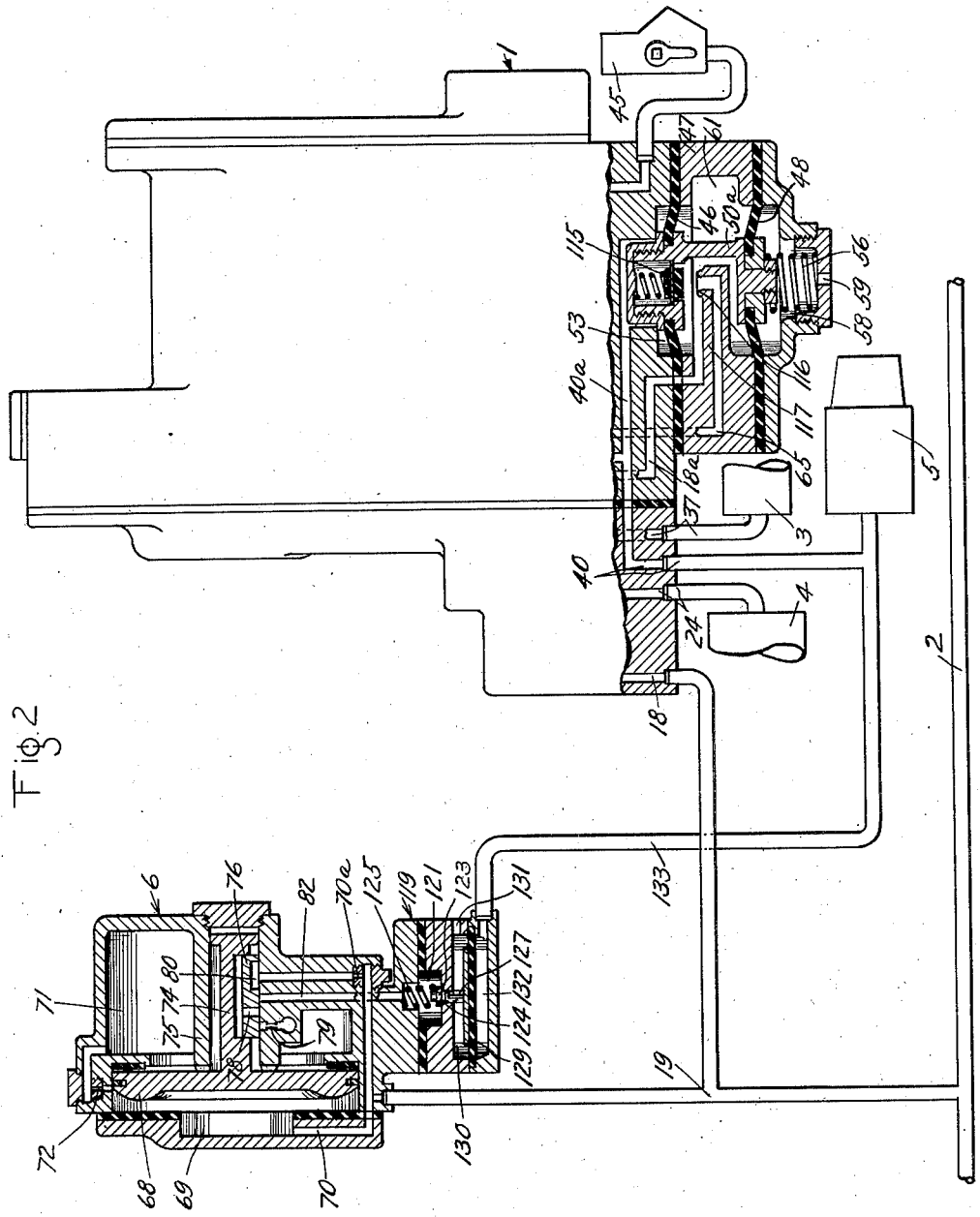
INVENTOR
ELLIS E. HEWITT
BY Wm. M. Cady
ATTORNEY Patented Nov. 15, 1938

2,137,018

UNITED STATES PATENT OFFICE 2,137,018

BRAKE CONTROL MEANS

Ellis E. Hewitt, Edgewood, Pa., assignor to The Westinghouse Air Brake Company, Wilmerding, Pa., a corporation of Pennsylvania Application August 19, 1937, Serial No. 159,850

20 Claims. (Cl. 303—81)

This invention relates to automatic fluid pressure brake equipment, and more particularly to brake controlling valve devices embodying means for effecting serial quick service action.

In the copending application of Ellis E. Hewitt and Donald L. McNeal, filed in the United States Patent Office on August 24, 1937, Serial No. 160,562, there is disclosed a brake equipment designed primarily for high speed passenger trains of the articulated car type, the equipment including a brake controlling valve device having quick service means for locally venting air from the brake pipe in several stages in order to effect rapid propagation of the reduction in brake pipe pressure when effecting an initial application of the brakes, and graduated release means for effecting the release of the brakes by degrees or steps, together with a combined quick service limiting and cut-off valve means which is operative upon a predetermined build up in brake cylinder pressure to close the single communication through which air is vented from the brake pipe by the quick service means. As explained in the above copending application, the quick service communication is thus closed not only to limit quick service venting in response to an initial reduction in brake pipe pressure, but also to avoid undesired quick service activity of the controlling valve device during a graduated release of the brakes. Accordingly, after a service application of the brakes has been effected and the brake cylinder pressure has been increased above the predetermined value, usually between ten and fourteen pounds per square inch, the limiting valve means referred to becomes effective to prevent functioning of the quick service means in the brake controlling valve device during a subsequent application of the brakes.

Under certain railway traffic conditions, however, it may be desirable to run passenger trains made up of cars having the above type of brake equipment together with cars of the type employing the well known universal valve equipment, which is provided with quick service means adapted to function in response to every reduction in brake pipe pressure and regardless of brake cylinder pressure. In controlling passenger trains of this type, which may include twenty-four cars or more, an application of the brakes is generally made in steps or graduations in order to bring the train to a smooth stop. The last stages of a graduated reduction in brake pipe pressure are usually effected when the pressure of fluid in the brake cylinders is greater than the predetermined pressure of ten to fourteen pounds above mentioned, and it will thus be apparent that unless the brake controlling valve devices of the type disclosed in the aforementioned application are provided with independent means whereby quick service activity is made available during each reduction in brake pipe pressure, it may be difficult to effect a graduated and uniform application of the brakes on cars in the mixed train with maximum rapidity. For the same reasons, it may be difficult to effect a quick reapplication of the brakes on such a train following a partial release made while controlling the brakes by the well known method of cycling during the descent of the train down a long grade.

One object of my invention is to obviate the above difficulties by providing independently operative quick service vent valve means adapted to be associated with a brake controlling valve device embodying an automatically limited quick service feature, which independent quick service means is adapted to be rendered effective only when the other quick service means has been cut out of operation.

Another object of the invention is to provide, in combination with a brake controlling valve device having quick service means which is adapted to be cut out of action upon an increase in brake cylinder or control chamber pressure to a certain value, quick service vent valve means independently operative upon a reduction in brake pipe pressure, and control means preventing the functioning of said independent quick service vent valve means while brake cylinder pressure is below said predetermined value and operative to render said independent quick service means effective when brake cylinder pressure is increased to said predetermined value.

A further object of the invention is to provide an auxiliary quick service device of the above type which, although ineffective during an initial reduction in brake pipe pressure, is adapted to effect local venting of fluid under pressure from the brake pipe in response to subsequent reductions in brake pipe pressure made in effecting a graduated application of the brakes or in effecting a reapplication as in cycling.

Other objects and advantages of the invention will appear in the following more detailed description thereof, taken in connection with the accompanying drawings, wherein:

Fig. 1 is a diagrammatic sectional view of a fluid pressure brake apparatus embodying one form of my invention; and Fig. 2 is a similar view of a fluid pressure brake apparatus embodying a modified form of the invention.

Referring to Fig. 1 of the drawings, the brake apparatus includes a brake controlling valve device 1, a brake pipe 2, an auxiliary reservoir 3, a supplementary reservoir 4, a brake cylinder 5, and an auxiliary quick service vent valve device 6. The brake controlling valve device 1 is somewhat similar to the service portion of the brake controlling valve device disclosed in the copending patent application of Hewitt and McNeal already mentioned, although for the purpose of illustration, the device is here disclosed in simplified form, elements not needed for a full understanding of the present invention being omitted. It will also be understood that suitable relay valve means, not shown, may be associated with the brake controlling valve device for controlling the supply of fluid under pressure to the brake cylinder.

As shown in Fig. 1 of the drawings, the brake controlling valve device 1 comprises a main casing section 10 having formed therein a slide valve chamber 11 containing a service slide valve 12 and a graduating slide valve 13, both of which are adapted to be operated by a service piston 15 through the medium of a stem 16. The piston 15 is subject on one side to the pressure of fluid in the valve chamber 11, and has on the opposite side a chamber 17 which communicates by way of a passage 18 and a branch passage 19 with the brake pipe 2. With the piston 15 in release position as shown in the drawings, the piston chamber 17 communicates through a feed passage 21, a chamber 22 containing a pair of check valves 23, and a passage and pipe 24 with the supplementary reservoir 4. With the service slide valve 12 likewise in release position the valve chamber 11 communicates through a port 27 in the slide valve and a passage 28 with a piston chamber 29 formed in the casing section and having mounted therein a release piston 30.

The release piston 30 is adapted to operate a release slide valve 32 through the medium of a stem 33 in graduating the release of the brakes as hereinafter explained. The release slide valve 32 is disposed in a valve chamber 35 which is connected by way of a passage 36 to the slide valve chamber 11, and by way of a passage and pipe 37 to the auxiliary reservoir 3. A spring 39 is interposed between the release piston 30 and the wall of the chamber 29 for urging the piston and slide valve to release position as shown in the drawings. With release slide valve 32 in this position, the brake cylinder 5 is connected to atmosphere by way of a pipe and passage 40, a passage 41, a cavity 42 in the slide valve, and thence through an exhaust passage and pipe 43 and the usual retainer valve device 45, while the valve chamber 35 is in communication by way of a passage 44 and the passage and pipe 24 with the supplementary reservoir 4.

The retainer valve device 45 may be of any desired type, and is adapted to be adjusted for retaining a certain fluid pressure in the brake cylinder when the brakes on the train are released to effect recharging of the brake pipe during cycling operation of the brakes in controlling the descent of the train down a long grade.

The brake controlling valve device 1 is provided with a combined quick service limiting and selector valve mechanism which is adapted to control the quick service functioning of the service and auxiliary slide valves 12 and 13 and also the functioning of the auxiliary quick service device 6, as hereinafter explained. This mechanism comprises a flexible diaphragm 46 interposed between the casing section 10 and a casing section 47; a similar diaphragm 48 clamped between the casing section 47 and a cover plate 49, and a follower member 50 which is disposed between and is suitably secured to both of said diaphragms. Formed at the upper side of the diaphragm 46 is a chamber 53 which communicates through a passage 40a and the passage and pipe 40 with the brake cylinder 5, the chamber 53 being adapted to receive the upper portion of the follower member 50 which is engageable with an annular shoulder 54 provided on the casing section 10 for limiting upward movement of the follower member and the associated diaphragms. A spring 56 is provided for urging the follower member 50 and the diaphragms 46 and 48 upwardly into the normal position shown in the drawings, the spring being interposed between the lower end of the follower member and a cap 57 closing a chamber 58 at the lower side of the diaphragm 48, which chamber communicates through a port 59 in the cap with the atmosphere.

Between the diaphragms 46 and 48 is formed a chamber 61 having mounted therein a selector slide valve 62, which is adapted to be operated through the medium of the follower member 50 and is engaged by suitable shoulders formed on that member. With the selector slide valve 62 in the normal or release position shown in Fig. 1, a port 63 therein maintains communication between the chamber 61 and a primary quick service passage 65, which leads past a ball check valve 66 to the seat of the service slide valve 12.

The auxiliary quick service valve device 6 comprises a casing having a bore within which is mounted a piston 68, which is subject on one side to the pressure of fluid in a chamber 69 communicating through a passage and pipe 70 with the brake pipe 2, and on the other side to the fluid pressure in a volume chamber 71, which is adapted to be charged by way of a restricted feed port 72 formed in the casing and communicating with chamber 69 when the piston is in the normal position as shown in the drawings. The piston 68 is provided with a stem 74, which extends into the volume chamber 71 within a guide portion 75 of the casing and is suitably notched to receive a slide valve 76, which is thus adapted to be operated by the piston 68 in accordance with variations in the fluid pressures in the chambers 69 and 71.

The slide valve 76 of the auxiliary quick service device has a port 78 and a cavity 80, both of which are lapped while the slide valve is in the normal position as shown in Fig. 1. However, when the piston 68 is operated, as hereinafter explained to move the slide valve to venting position, the port 78 is adapted to establish communication from the volume chamber 71 to a restricted atmospheric exhaust port 79, while the cavity 80 is adapted to register with a branch of the brake pipe passage 70 having a restricted portion 70a, and with a passage 82, which communicates by way of a pipe 83 and a secondary quick service passage 84 in the brake controlling valve device 1 with the seat of the selector slide valve 62. It will be noted that the passage 84 is lapped by the slide valve 62 in the normal position thereof, as shown in Fig. 1.

In conditioning the brake apparatus shown in Fig. 1 for operation, fluid under pressure supplied in the usual manner to the brake pipe 2 flows therefrom through the pipe 19 and the passage 18 in the brake controlling valve device 1 to the piston chamber 17, moving the piston 15 and the service and auxiliary slide valves 12 and 13 to release position as illustrated in the drawings. With the service piston 15 in release position, fluid under pressure is supplied from the chamber 17 through the usual feed groove 90 to the slide valve chamber 11, and thence through the passage 36, chamber 35, and passage and pipe 37 to the auxiliary reservoir 3. At the same time, fluid under pressure is supplied from the piston chamber 17 through the passage 21, past the check valves 23, and through the chamber 22 and passage and pipe 24 to the supplementary reservoir 4. Fluid under pressure also flows from the slide valve chamber 11 by way of the port 27 in the service slide valve 12 and the passage 28 to the piston chamber 29. Since the fluid pressure acting on opposite sides of the release piston 30 are thus equal, the spring 39 maintains the release piston and the slide valve 32 in the position shown in the drawings. With the release slide valve 32 in this position, the brake cylinder 5 and the diaphragm chamber 53 are connected with the atmosphere by way of the passages 40 and 40a, respectively, the passage 41, the cavity 42, and passage and pipe 43 and the retainer valve device 45.

It will be noted that fluid under pressure is also supplied from the brake pipe by way of the passages 18 and 18a to the chamber 61 between the diaphragms 46 and 48, and that the quick service limiting and selector valve 62 is at this time maintained in its normal or release position by the force of the spring 56 acting through the medium of the follower member 50.

Fluid under pressure is also supplied from the brake pipe 2 through the pipe 70 and passage 70 in the auxiliary quick service valve device 6 into the chamber 69, and flows therefrom through the feed groove 72 to the volume chamber 71.

When the pressure of fluid in the brake pipe 2 is reduced initially in order to effect an application of the brakes, the corresponding reduction in fluid pressure in the service piston chamber 17 of the brake controlling valve device causes the piston 15 to be moved to the left by the pressure of fluid in the valve chamber 11, the auxiliary slide valve 13 being thereby moved through the medium of the stem 16 to quick service position, while the service slide valve 12 remains positioned as shown in the drawings.

On movement of the auxiliary slide valve 13 to quick service position, a cavity 92 therein registers with ports 93 and 94 in the service slide valve 12, and fluid under pressure is then locally vented from the brake pipe 2 by way of the pipe 19, the passage 18, the passage 18a, the chamber 61, and thence by way of port 63 in the selector slide valve 62, the primary quick service passage 65, past the check valve 66, and through the port 14, cavity 92, and port 93 to a quick service bulb 96, which communicates with a restricted atmospheric exhaust port 97. This initial venting of fluid under pressure from the brake pipe to the bulb 96 and the atmospheric port 97 first effects a rapid local reduction of brake pipe pressure for insuring the prompt movement of the controlling valve device on the next car, so as to produce serial operation of the brakes on adjacent cars throughout the train, followed by a slower or gradual reduction which absorbs any surges or pressure waves in the brake pipe.

At the same time, when the service piston 15 and the auxiliary slide valve 13 are moved to quick service position, fluid under pressure is vented to the atmosphere from the release piston chamber 29 by way of the passage 28, the port 27 in the service slide valve 12, a cavity 99 in the auxiliary slide valve, a port 100 in the service slide valve and an atmospheric exhaust port 101, and the auxiliary reservoir pressure acting in the chamber 35 thus becomes effective to overcome the force of spring 39 and causes movement of the release piston 30 and the release slide valve 32 toward the right-hand, thereby cutting off communication between the brake cylinder passage 41 and the atmosphere, and also lapping the supplementary reservoir passage 44.

The initial reduction in the pressure of fluid in the brake pipe and consequently in the service piston chamber 17, as augmented by the local quick service venting caused by operation of the auxiliary slide valve 13, effects continued movement of the service piston 15 and the stem 16 toward the left-hand, a lug 103 on the end of the stem being thereby brought into engagement with the service slide valve 12, which is then shifted together with the auxiliary slide valve into service position. On movement of the slide valves to the service position, the communication from the quick service passage 65 to the bulb 96 is cut off, while a cavity 105 in the service slide valve establishes communication between the passage 65 and a passage 106 which communicates with the brake cylinder passage 40 through a restricted passage 107. Fluid under pressure is then vented from the brake pipe 2 by way of the quick service passage 65 and through the cavity 105 and passages 106, 107, and 40 to the brake cylinder 5. This last stage of quick service venting is finally terminated by operation of the selector valve mechanism, as will hereinafter be explained.

The quick service activity of the brake controlling valve device 1 is thus completed in three stages; the first stage being the venting of brake pipe fluid to the bulb 96 to propagate the reduction in brake pipe pressure throughout the train, the second stage being the flow by way of the restricted port 97 to dampen undesired surging of brake pipe pressure and to aid movement of the slide valve to the service position, while the final stage of quick service venting is adapted to insure maintenance of the slide valves in service position long enough to permit build up of pressure in the brake cylinders at least to a predetermined value and further to dampen surging of brake pipe pressure.

As a further result of movement of the service slide valve 12 to service position as just explained, communication is established from the slide valve chamber 11 through a service port 108 in the slide valve to the brake cylinder passage 40, so that fluid under pressure is thereby supplied from the auxiliary reservoir 3 to the brake cylinder 5 for effecting a service application of the brakes.

Meanwhile, the initial reduction in brake pipe pressure effects movement of the parts of the auxiliary quick service valve device 6 in the manner about to be explained, although it should be understood that such movement is ineffective to cause this device to vent fluid under pressure from the brake pipe while the quick service limiting and selector slide valve 62 in the brake controlling valve device is in the normal or release position shown in Fig. 1.

When the pressure of fluid in the piston chamber 69 acting against the piston of quick service device 6 is reduced with brake pipe pressure below the pressure of fluid in the chamber 71, the piston 68, stem 74 and slide valve 76 are shifted to the left as viewed in Fig. 1 of the drawings, until the port 78 in the slide valve is brought into registration with the restricted atmospheric exhaust port 79. Fluid under pressure is then vented from the volume chamber 71 to the atmosphere at a rate such that the reduction in fluid pressure in the chamber is effected at a somewhat faster rate than the service rate of reduction in the pressure of fluid in the brake pipe 2 and in the piston chamber 69, and when the fluid pressure in the volume chamber 71 is thus reduced slightly below that in the chamber 69, said piston and the slide valve 76 are moved back to the normal position. It will be understood, of course, that although the brake pipe passage 70 has been connected through the cavity 80 in the slide valve with the passage 82 for an interval during the above described operation of the auxiliary quick service device 6, fluid under pressure is not thereby vented from the brake pipe 2, since the secondary quick service passage 84 in the brake controlling valve device 1 is at this time lapped by the selector slide valve 62.

The pressure of fluid in the brake cylinder 5 is meanwhile increased by the supply of fluid under pressure thereto from the auxiliary reservoir 3 as hereinbefore explained, and when the fluid pressure in the brake cylinder and in the diaphragm chamber 53 connected thereto is thus built up to the value at which the quick service selector valve mechanism is adapted to operate, which may be ten to fourteen pounds per square inch, the diaphragm 46 and the associated follower member 50 and the diaphragm 48 are moved downwardly against the force of the spring 56. In so moving the follower member 50 operates the selector slide valve 62 to cut off the primary quick service passage 65 and to establish communication from the secondary quick service passage 84 by way of a cavity 110 to an atmospheric exhaust port 111. Further quick service venting of fluid under pressure from the brake pipe by way of the primary quick service passage 65 to the brake cylinder 5 is thereby cut off, and since by this time the auxiliary quick service device 6 will have been operated in response to the initial brake pipe reduction and returned to normal or lap position, the connection between the secondary quick service passage 84 and the atmosphere does not as yet have any quick service effect.

It is customary for the engineer of a passenger train to effect the service application of the brakes in several steps, which he does by operating the brake valve to reduce brake pipe pressure in two or more stages. It will be understood that when the initial stage of reduction in brake pipe pressure has been completed and the engineer's brake valve device, not shown in the drawings, has been moved temporarily to lap position, further reduction in the fluid pressure in the piston chamber 17 of the brake controlling valve device is checked. When the pressure of fluid in the auxiliary reservoir 3 and in the slide valve chamber 11 connected thereto has then been reduced, by flow of fluid to the brake cylinder, to a value slightly below the fluid pressure in the piston chamber 17, the service piston 15 and the auxiliary slide valve 13 are again shifted to the right until the auxiliary slide valve laps the service port 108 in the service slide valve 12, which remains stationary.

When the pressure of fluid in the brake pipe is then further reduced in order to effect a further application of the brakes with increased power in the same service application in the brakes, the service piston 15 is again operated to shift the auxiliary slide valve 13 relatively to the service slide valve 12 into the service position, thereby uncovering the service port 108 for permitting a further supply of fluid under pressure from the auxiliary reservoir 3 to the brake cylinder 5. It will be noted, however, that at this time the quick service venting of fluid under pressure from the brake pipe to the brake cylinders is not effected by the brake controlling valve device 1, since the quick service selector valve 62 has been positioned to cut off communication between the brake pipe passage 18a and the primary quick service passage 65 as hereinbefore explained.

The desired function of local quick service venting of fluid under pressure from the brake pipe is, nevertheless, provided by reason of the repeated operation of my auxiliary quick service valve device 6 in response to the second stage of reduction in brake pipe pressure. When the piston 68 is moved to the left in response to the reduction in fluid pressure in the chamber 69, the slide valve 76 is thereby operated to establish communication from the brake pipe passage 70 to the passage 82, which is now connected by way of the pipe 83, the secondary quick service passage 84 in the brake controlling valve device, cavity 110 and port 111 to the atmosphere. Fluid under pressure is thus vented from the brake pipe 2 through the above communications to the atmosphere at a rate determined by the size of the restricted passage 70a in the device 6. At the same time fluid under pressure is vented from the volume chamber 71 through the slide valve port 78 and the atmospheric exhaust port 79, so that the fluid pressure in said volume chamber is reduced at a rate slightly faster than the rate of reduction of the brake pipe pressure in the piston chamber 69, with the result that the piston 68 and slide valve 76 are again moved to normal position, cutting off further quick service venting of fluid under pressure from the brake pipe. The limited local quick service reduction in the pressure of fluid in the brake pipe thus effected is followed by similar reductions at each of the cars in the train so as to effect the quick serial operation of the brakes.

It will thus be apparent that, in addition to the quick service means in the brake controlling valve device 1 operative on an initial reduction in the pressure of fluid in the brake pipe to vent fluid therefrom in first and second stages to the bulb 96 and the restricted atmospheric port 97 and in a final stage to vent fluid from the brake pipe to the passage 40 to the brake cylinder 5, which means is controlled by the selector valve 62, there is provided a separate auxiliary quick service vent valve device operative to discharge a limited amount of fluid under pressure from the brake pipe only in response to a reduction in brake pipe pressure effected after the multistage quick service means has been cut off. The auxiliary quick service device is thus adapted to provide a so-called continuous or always available quick service function each time the brake pipe pressure is reduced, as in effecting a graduated application of the brakes or in cycling on a grade.

When it is desired to effect the release of the brakes, fluid under pressure is supplied to the brake pipe 2 by operation of the usual engineer's brake valve device, not shown, and upon the consequent increase in fluid pressure in the chamber 17 of the brake controlling valve device, the service piston 15 is operated to move the service and auxiliary slide valves 12 and 13 to the release position as shown in Fig. 1 of the drawings.

Fluid under pressure then flows from the chamber 11 through the port 27 in the service slide valve and the passage 28 to the release piston chamber 29, and with the fluid pressures on opposite sides of the release piston 30 thereby equalized, the spring 39 moves the release piston and the release slide valve 32 to the left, establishing communication from the brake cylinder 5 to the atmosphere by way of the pipe and passage 40, passage 41, cavity 42, passage and pipe 43, and the retainer valve device 45. In so moving, the slide valve 32 also uncovers the passage 44, so that fluid under pressure is supplied from the supplementary reservoir 4 through the passage, at a rate determined by a restricted portion 44a in said passage, to the chamber 35 and thence to the auxiliary reservoir 3, thereby aiding the initial recharging of the auxiliary reservoir to permit quicker build up in brake pipe pressure throughout the train.

If it is desired to graduate the release of the brakes, the brake valve device, not shown, may be returned to lap position after the pressure in the brake pipe has been partially restored in effecting the initial release of the brakes, thus checking further increase in brake pipe pressure. Continued flow of fluid under pressure from the supplementary reservoir 4 then increases the auxiliary reservoir pressure acting in the chamber 11 so as to move the service piston and graduating slide valve 13 to the left into graduated release lap position, wherein the cavity 99 connects ports 27 and 100 in the release slide valve, so that fluid under pressure is again exhausted from the release piston chamber 29 and the release piston 30 and valve 32 are once more shifted to the right, lapping the passages 41 and 44. Fluid at reduced pressure is thus retained in the brake cylinder 5 for a desired interval, after which a further graduation in the release of the brakes may be effected.

Referring to Fig. 2 of the drawings, the brake apparatus there disclosed is similar to that shown in Fig. 1, with the exception that separate and independently operative valve mechanisms are provided for controlling the quick service means embodied in the brake controlling valve device 1 and for controlling the auxiliary quick service vent valve device 6 in accordance with the increase in brake cylinder pressure. In the brake controlling valve device 1 shown in Fig. 2, communication between the brake pipe passage 18a and the quick service vent passage 65 is controlled by a spring weighted valve 115 which is operatively mounted within a hollow follower member 50a that is disposed in the chamber 61 and is secured to the diaphragms 46 and 48. The valve 115 is adapted to engage an annular seat 116 carried on a portion 117 of the casing, which extends into the chamber 61 and through which portion is formed the quick service passage 65.

The auxiliary quick service valve device 6 comprises the same elements already described in connection with the device as shown in Fig. 1 of the drawings, and in addition is provided with a control portion 119 as shown in Fig. 2. Formed in the control portion 119 is a valve chamber 121 which communicates with the passage 82 and contains a valve 123 adapted to be urged into engagement with a seat 124 by the force of a spring 125 that is interposed between the valve and the upper wall of the chamber 121. The valve 123 has a fluted stem 127 through the medium of which the valve is adapted to be operated by a flexible diaphragm 129, which has at the upper side thereof a chamber 130 communicating with the atmosphere through a passage 131, and at the lower side a pressure chamber 132 that is connected by way of a pipe 133 with the brake cylinder 5. The spring 125 is adapted to exert sufficient force to maintain the valve 123 seated until the pressure of fluid in the pressure chamber 132 and in the brake cylinder 5 is increased to substantially the value at which the diaphragms 46 and 48 within the brake controlling valve device 1 are operative to effect closing of the valve 115 against the force of the spring 56.

The operation of the apparatus shown in Fig. 2 will be apparent from the description hereinbefore presented in connection with Fig. 1 of the drawings. When an initial service reduction in the pressure of fluid in the brake pipe 2 is effected, the triple valve means embodied in the brake controlling valve device 1 is operated in the usual manner to effect the quick service venting of fluid from the brake pipe in three stages while causing the supply of fluid under pressure from the auxiliary reservoir 3 to the brake cylinder 5, this operation having been already described.

At the same time, the auxiliary quick service valve device 6 responds to the initial reduction in brake pipe pressure, the piston 68 and slide valve 76 being thereby moved to venting position until sufficient fluid under pressure is vented from the volume chamber 71 through the port 78 and exhaust port 79 to permit movement to lap position as hereinbefore explained, it being understood, however, that this operation of the device 6 is not effective to cause venting of fluid under pressure from the brake pipe since the valve 123 is at this time maintained in seated position.

When the pressure of fluid in the brake cylinder 5 and in the diaphragm chamber 53 in the brake controlling valve device 1 has been built up to the value determined by the force of the spring 56, the diaphragm 46, follower member 50a and diaphragm 48 are moved downwardly until the valve 115 engages the seat 116, thereby cutting off the further quick service action of the brake controlling valve device 1.

At about the same time, with substantially the same predetermined brake cylinder pressure acting in the chamber 132 of the auxiliary quick service valve device 6, the force of the spring 125 is overcome and the diaphragm 129 is moved upwardly so as to unseat the valve 123 through the medium of the stem 127. Communication is thus established from the passage 82 through the chamber 121, past the valve 123, and through the chamber 130 and the passage 131 to atmosphere, although it will be remembered that the passage 82 is still lapped by the slide valve 76.

If a further reduction in the pressure of fluid in the brake pipe is now effected, the brake controlling valve device 1 is again operated to effect an additional supply of fluid under pressure to the brake cylinder 5, although quick service activity of the device 1 is prevented since the quick service passage 65 is closed by the cut off valve 115 due to the pressure of fluid in the brake cylinder.

When the pressure of fluid in the brake pipe 2 and in the chamber 69 of the auxiliary quick service valve device 6 is thus reduced for the second time, the pressure of fluid remaining in the volume chamber 71 again becomes effective to move the piston 68 to the left as viewed in the drawings, thereby shifting the slide valve 76 to venting position wherein the port 78 connects the volume chamber to the atmospheric port 79 while the cavity 80 establishes communication between the brake pipe passage 70 and the brake pipe passage 82. Fluid under pressure is then vented from the brake pipe 2 by way of the branch pipe 19, the passage 70 and the restricted portion 70a, the cavity 80, passage 82, chamber 121, past the unseated valve 123, and through the chamber 120 and port 131 to the atmosphere. The local quick service venting of fluid under pressure from the brake pipe is then checked upon reduction of the fluid pressure in the volume chamber 71 to a degree slightly below the brake pipe pressure in the chamber 69 and the consequent movement of the piston 68 and slide valve 76 to lap position.

It will now be apparent that, according to my invention, an auxiliary quick service valve means is provided for effecting the local quick service venting of fluid under pressure from the brake pipe in response to reductions in the pressure therein subsequent to the attainment of a predetermined brake cylinder pressure and after the quick service means embodied in the usual brake controlling valve device has been rendered ineffective. By means of the invention, therefore, a so-called continuous or always available quick service function is obtained each time the brake pipe pressure is reduced, as in effecting a graduated application of the brakes or in cycling on a grade.

While two illustrative embodiments of the invention have been described in detail, it is not my intention to limit its scope to those embodiments or otherwise than by the terms of the appended claims.

Having now described by invention, what I claim is new and desire to secure by Letters Patent, is:

1. In a fluid pressure brake apparatus, in combination, a brake pipe, a brake controlling valve device operative upon a reduction in brake pipe pressure for effecting an application of the brakes and including a main quick service means operative upon the reduction in brake pipe pressure to locally vent fluid from the brake pipe, a supplemental quick service means operative upon a reduction in brake pipe pressure for locally venting fluid from the brake pipe, and means operative upon a predetermined increase in the pressure of fluid supplied in effecting an application of the brakes for closing communication through which said main quick service means effects the venting of fluid from the brake pipe and for establishing communication through which said supplemental quick service means effects venting of fluid from the brake pipe.

2. In a fluid pressure brake apparatus, in combination, a brake pipe, a brake controlling valve device operative upon a reduction in brake pipe pressure for effecting an application of the brakes, a main quick service means operative upon the reduction in brake pipe pressure for effecting a local venting of fluid from the brake pipe, means for preventing said quick service means from effecting a further venting of fluid from the brake pipe upon a further reduction in brake pipe pressure in the same brake application, a supplemental quick service means operative upon said further reduction in brake pipe pressure for venting fluid from the brake pipe, and means for preventing operation of said supplemental quick service means to vent fluid from the brake pipe until said main quick service means is cut out of operation.

3. In a fluid pressure brake apparatus for a railway vehicle, in combination, a normally charged brake pipe, a brake controlling valve device operative upon a reduction in pressure of fluid in said brake pipe to effect an application of the brakes and including quick service means operative upon an initial reduction in brake pipe pressure to vent fluid from said brake pipe, an auxiliary quick service valve device adapted to operate in response to reductions in the fluid pressure in said brake pipe for venting fluid under pressure therefrom, and means for preventing said auxiliary quick service valve device from venting fluid under pressure from the brake pipe in response to an initial reduction in brake pipe pressure made in effecting an application of the brakes.

4. In a fluid pressure brake apparatus for a railway vehicle, in combination, a normally charged brake pipe, a brake controlling valve device operative according to variations in the pressure of fluid in said brake pipe for effecting the application and release of the brakes, said device including quick service means operative upon an initial reduction in the pressure in said brake pipe to vent fluid therefrom, an auxiliary quick service valve device adapted to operate in response to reductions in brake pipe pressure for venting fluid from the brake pipe, and a valve mechanism for normally rendering said quick service valve device ineffective to vent fluid from the brake pipe, said valve mechanism being operative upon effecting a brake application of a predetermined degree to render said quick service valve device effective.

5. In a fluid pressure brake apparatus for a vehicle in a train, in combination, a normally charged brake pipe, a brake controlling valve device operative according to variations in the pressure of fluid in said brake pipe for effecting the application and release of the brakes, said device including quick service means operative upon an initial reduction in pressure in the brake pipe to vent fluid therefrom, an auxiliary quick service valve device adapted to operate in response to reductions in brake pipe pressure for venting fluid from the brake pipe, and a valve mechanism controlling the communication through which said auxiliary device is adapted to vent fluid under pressure upon the brake pipe, said valve mechanism being operative to open said communication only after a predetermined degree of application of the brakes has been effected.

6. In a fluid pressure brake apparatus for a railway vehicle, in combination, a normally charged brake pipe, a brake controlling valve device operative according to variations in the pressure of fluid in said brake pipe for effecting the application and release of the brakes, said device including quick service means operative upon an initial reduction in the brake pipe pressure to vent fluid therefrom, an auxiliary quick service valve device operative upon a reduction in brake pipe pressure for venting fluid under pressure from said brake pipe, and a quick service control mechanism comprising a valve normally closing the communication through which said auxiliary quick service device vents fluid under pressure from the brake pipe and a movable abutment adapted to operate said valve for opening said communication upon a predetermined increase in the pressure of fluid supplied by said brake controlling valve device in effecting an application of the brakes.

7. In a fluid pressure brake apparatus for a railway vehicle, in combination, a normally charged brake pipe, a brake controlling valve device operative according to variations in the pressure of fluid in said brake pipe for effecting the application and release of the brakes, said device including quick service means operative upon an initial reduction in the pressure in the brake pipe to vent fluid therefrom, an auxiliary quick service valve device operative upon a reduction in brake pipe pressure to vent fluid under pressure from the brake pipe, a chamber to which fluid under pressure is supplied by operation of said brake controlling valve device in effecting an application of the brakes, and a quick service control mechanism comprising a normally closed valve controlling the communication through which said auxiliary quick service valve device is adapted to vent fluid from the brake pipe, and a movable abutment subject to the pressure of fluid in said chamber and operative upon a predetermined increase in fluid pressure in said chamber for opening the last named valve.

8. In a fluid pressure brake apparatus for a railway vehicle, in combination, a normally charged brake pipe, a brake controlling valve device operative according to variations in the pressure of fluid in said brake pipe for effecting the application and release of the brakes, and including quick service means operative upon an initial reduction in pressure in the brake pipe to vent fluid therefrom, an auxiliary quick service valve device operative upon a reduction in brake pipe pressure to vent fluid under pressure from the brake pipe, a chamber to and from which fluid under pressure is supplied and released by said brake controlling valve device in controlling the brakes, and a quick service control mechanism operative while the fluid pressure in said chamber is less than a predetermined value to render said auxiliary quick service valve device ineffective to vent fluid from the brake pipe.

9. In a fluid pressure brake for a vehicle in a train, in combination, a normally charged brake pipe, a brake controlling valve device operative according to variations in the pressure of fluid in said brake pipe for effecting the application and release of the brake and including quick service means operative upon an initial reduction in the pressure in said brake pipe to vent fluid therefrom, an operating chamber within which variations in fluid pressure are effected by operation of said brake controlling valve device in causing the application and release of the brake, an auxiliary quick service valve device adapted to operate in response to a reduction in brake pipe pressure for venting fluid under pressure from said brake pipe, a spring, a valve subject to the force of said spring for normally closing the communication through which said auxiliary device is adapted to vent fluid, and diaphragm means subject to the pressure of fluid in said operating chamber and cooperative with said valve upon a predetermined increase in the pressure on said chamber to open said communication.

10. In a fluid pressure brake apparatus, in combination, a brake pipe, a brake controlling valve device operative upon a reduction in brake pipe pressure for effecting an application of the brakes, said valve device including a main quick service means operative upon an initial reduction in brake pipe pressure for effecting a local venting of fluid from the brake pipe through a primary quick service communication, a secondary quick service communication through which fluid may be vented locally from the brake pipe, an auxiliary quick service valve device normally closing said secondary communication and operative upon each reduction in brake pipe pressure to open said communication, and other valve means also normally closing said secondary communication and operative in response to a predetermined build up in the pressure of fluid supplied by said brake controlling valve device in effecting an application of the brakes to open and maintain said secondary communication open.

11. In a fluid pressure brake apparatus, in combination, a brake pipe, a brake controlling valve device operative according to variations in the pressure of fluid in said brake pipe for effecting the application and release of the brakes, said device including quick service means operative upon an initial reduction in pressure in the brake pipe to vent fluid therefrom, an auxiliary quick service valve device adapted to operate upon a reduction of fluid in said brake pipe for venting fluid therefrom, and a selector valve mechanism for controlling the effective operation of both said quick service means and said auxiliary quick service device, said mechanism having one position for rendering only the first named quick service means effective to vent fluid from the brake pipe and another position for rendering only said auxiliary quick service valve device effective to vent fluid from the brake pipe.

12. In a fluid pressure brake apparatus for a railway vehicle, in combination, a normally charged brake pipe, a brake controlling valve device operative according to variations in the pressure of fluid in said brake pipe for effecting the application and release of the brakes, said device including a main quick service means operative upon an initial reduction in the pressure of fluid in the brake pipe for venting fluid under pressure therefrom, a communication through which fluid under pressure is supplied by operation of said brake controlling valve device in effecting an application of the brakes, an auxiliary quick service valve device operative independently of said brake controlling valve device upon a reduction in brake pipe pressure to vent fluid from the brake pipe, and quick service selector valve means operative while the fluid pressure in said communication is below a predetermined value to render said auxiliary quick service valve device ineffective for venting fluid, and when the fluid pressure in said communication is above said value to render said auxiliary quick service valve device effective while preventing further functioning of said main quick service means.

13. In a fluid pressure brake apparatus for a vehicle in a train, in combination, a normally charged brake pipe, an operating chamber to which fluid under pressure is supplied for effecting an application of the brakes, a brake controlling valve device operative according to variations in brake pipe pressure for controlling the supply of fluid under pressure to said chamber and embodying quick service means initially operative upon a reduction in pressure in the brake pipe to vent fluid therefrom in an amount sufficient to insure operation of said device to effect a predetermined increase in the pressure in said chamber, an auxiliary quick service valve device adapted to operate independently of said brake controlling valve device upon a reduction in pressure in said brake pipe to vent fluid therefrom, and a quick service control valve means subject to the pressure of fluid in said operating chamber, said control means being operative while the pressure in the operating chamber is below the predetermined value to prevent effective operation of the auxiliary quick service device, and when the pressure in said chamber is above said value to prevent effective operation of said quick service means in the brake controlling valve device, so that only the last-named quick service means vents fluid from the brake pipe in response to an initial reduction in the pressure therein, while only said auxiliary quick service device vents fluid from the brake pipe in response to any subsequent reduction in brake pipe pressure.

14. In a fluid pressure brake apparatus for a vehicle in a train, in combination, a normally charged brake pipe, an operating chamber to which fluid under pressure is supplied for effecting an application of the brakes, a brake controlling valve device operative according to variations in the pressure of fluid in the brake pipe for controlling the supply of fluid under pressure to said chamber, said device embodying quick service means initially operative upon a reduction in fluid pressure in the brake pipe to vent fluid therefrom, a quick service limiting valve device operative in response to the attainment of a predetermined pressure of fluid in said chamber for preventing further functioning of said quick service means, an auxiliary quick service valve device adapted to operate independently of said brake controlling valve device upon a reduction in pressure in the brake pipe for venting fluid therefrom, and a control valve device normally preventing said auxiliary quick service valve device from venting fluid from the brake pipe and operative upon substantially said predetermined pressure in said chamber for permitting subsequent operation of said auxiliary quick service device to vent fluid from the brake pipe.

15. In a fluid pressure brake apparatus for a railway vehicle, in combination, a normally charged brake pipe, an operating chamber to which fluid under pressure is supplied for effecting an application of the brakes, a brake controlling valve device operative according to variations in brake pipe pressure for controlling the supply of fluid under pressure to said chamber and embodying quick service means initially operative upon a reduction in fluid pressure in the brake pipe to vent fluid therefrom, a quick service limiting valve device operative in response to the attainment of a predetermined pressure of fluid in said operating chamber for cutting off the communication through which said quick service means is adapted to vent fluid from the brake pipe, an auxiliary quick service valve device adapted to operate independently of said brake controlling valve device upon a reduction in brake pipe pressure for venting fluid from the brake pipe, and valve means normally closing the communication through which said auxiliary valve device is adapted to vent fluid, said valve means being operative to open the last named communication upon the attainment of said predetermined pressure of fluid in said operating chamber.

16. In a fluid pressure brake, in combination, a brake pipe, a brake controlling valve device operative upon a reduction in brake pipe pressure to effect an application of the brakes and embodying a main quick service means operative upon an initial reduction in brake pipe pressure to effect a plurality of stages of local quick service venting of fluid from the brake pipe, means operative upon the attainment of a predetermined braking effect to render said main quick service means ineffective to vent fluid in any stage from the brake pipe, additional quick service means adapted to operate upon a reduction in brake pipe pressure to effect a limited local quick service venting of fluid from the brake pipe, and means for preventing said additional quick service means from functioning before the first mentioned quick service means has been rendered ineffective.

17. In a fluid pressure brake equipment for a vehicle in a train, in combination, a normally charged brake pipe, a brake controlling valve device operative on reduction in pressure of fluid in said brake pipe to effect application of the brakes, a quick service valve mechanism associated with said device and adapted to operate in response to reductions in the fluid pressure in said brake pipe for locally venting fluid under pressure therefrom, and means for modifying the action of said quick service valve mechanism by preventing operation thereof to vent fluid under pressure from the brake pipe in response to an initial reduction in brake pipe pressure while permitting operation of said mechanism upon subsequent reductions made in effecting an application of the brakes.

18. In a fluid pressure apparatus for a railway vehicle, in combination, a normally charged brake pipe, a brake controlling valve device operative according to variations in the pressure of fluid in said brake pipe for effecting the application and release of the brakes, a quick service valve device associated with said brake controlling valve device and adapted to operate in response to reductions in brake pipe pressure for venting fluid locally from the brake pipe, and a valve mechanism normally conditioned for rendering said quick service valve device ineffective to vent fluid from the brake pipe, said valve mechanism being automatically operative after establishment of a brake application of a predetermined degree to render said quick service valve device effective.

19. In a fluid pressure brake apparatus for a vehicle in a train, in combination, a normally charged brake pipe, a brake controlling valve device operative according to variations in the pressure of fluid in said brake pipe for effecting the application and release of the brakes, a quick service valve device adapted to operate in response to reductions in brake pipe pressure for venting fluid from the brake pipe, and a valve mechanism controlling the communication through which said quick service device is adapted to vent fluid from the brake pipe, said valve mechanism being operative to open said communication only after a predetermined degree of application of the brakes has been effected.

20. In a fluid pressure brake apparatus for a railway vehicle, in combination, a normally charged brake pipe, a brake controlling valve device operative according to variations in the pressure of fluid in said brake pipe for effecting the application and release of the brakes, a quick service valve device associated with said brake controlling valve device and operative upon a reduction in brake pipe pressure for establishing communication from said brake pipe to a vent passage, and a quick service control mechanism comprising a valve normally closing the vent passage and a movable abutment adapted to operate said valve to open said passage upon a predetermined increase in the pressure of fluid supplied by said brake controlling valve device when effecting an application of the brakes.

ELLIS E. HEWITT.